United States Patent
Lehoux-Lebacque et al.

(10) Patent No.: US 11,768,078 B2
(45) Date of Patent: Sep. 26, 2023

(54) METHOD FOR COMPUTING AN ITINERARY FROM A DEPARTURE LOCATION TO AN ARRIVAL LOCATION

(71) Applicant: Naver Corporation, Seongnam-si (KR)

(72) Inventors: Vassilissa Lehoux-Lebacque, Corenc (FR); Christelle Loiodice, La Tronche (FR)

(73) Assignee: Naver Corporation

( * ) Notice: Subject to any disclaimer, the term of this patent is extended or adjusted under 35 U.S.C. 154(b) by 108 days.

(21) Appl. No.: 16/853,914

(22) Filed: Apr. 21, 2020

(65) Prior Publication Data

US 2021/0325194 A1    Oct. 21, 2021

(51) Int. Cl.
*G01C 21/34* (2006.01)
*G06Q 10/047* (2023.01)

(52) U.S. Cl.
CPC ....... *G01C 21/3446* (2013.01); *G01C 21/343* (2013.01); *G01C 21/3423* (2013.01); *G06Q 10/047* (2013.01)

(58) Field of Classification Search
CPC ............ G01C 21/3446; G01C 21/3423; G01C 21/343; G06Q 10/047
See application file for complete search history.

(56) References Cited

U.S. PATENT DOCUMENTS

| | | | |
|---|---|---|---|
| 5,991,688 | A  | 11/1999 | Fukushima et al. |
| 6,779,060 | B1 | 8/2004  | Azvine et al. |
| 6,785,608 | B1 | 8/2004  | Milici et al. |
| 8,417,409 | B2 | 4/2013  | Bast et al. |

(Continued)

FOREIGN PATENT DOCUMENTS

| | | |
|---|---|---|
| EP | 3339806 A1 | 6/2018 |
| JP | 2007520685 | 7/2007 |

(Continued)

OTHER PUBLICATIONS

Sascha Witt, Trip-Based Public Transit Routing, 2015 (Year: 2015).*

(Continued)

*Primary Examiner* — Khoi H Tran
*Assistant Examiner* — Tristan J Greiner
(74) *Attorney, Agent, or Firm* — Michael J. Nickerson; Dawson Law Firm, PC

(57) ABSTRACT

A method creates a reduced set of feasible transfers T(t, L') for a trip t of line L, for each target line L' from a set of all transfers from line L to all other lines, by computing, for each origin line L, feasible transfers between stations of the origin line L and a destination line L'; sorting the computed feasible transfers to create a transfer set T(L); determining, for each trip t of origin line L, and for each transfer in the transfer set T(L), an earliest trip t' of L' wherein the transfer is feasible; and adding, for each trip t of origin line L, the determined transfer from t to t' to the reduced set of feasible transfers T(t, L') when trip t' is the only destination trip of the transfers in the reduced set of feasible transfers T(t, L') passing at the destination station and when it is earlier than all the previous destination trips of the transfers in the reduced set of feasible transfers T(t, L') passing by the destination station.

17 Claims, 6 Drawing Sheets

(56) References Cited

U.S. PATENT DOCUMENTS

| | | | |
|---|---|---|---|
| 8,494,771 | B2 | 7/2013 | Delling et al. |
| 2002/0059025 | A1 | 5/2002 | Kim et al. |
| 2004/0218536 | A1 | 11/2004 | Yasukawa et al. |
| 2005/0043884 | A1 | 2/2005 | Atarashi |
| 2007/0008949 | A1 | 1/2007 | Balandin |
| 2008/0075007 | A1 | 3/2008 | Mehta et al. |
| 2010/0036606 | A1 | 2/2010 | Jones |
| 2010/0082245 | A1 | 4/2010 | Patenaude et al. |
| 2010/0228574 | A1 | 9/2010 | Mundinger et al. |
| 2010/0280853 | A1 | 11/2010 | Petralia et al. |
| 2010/0305984 | A1 | 12/2010 | Ben-Yitschak et al. |
| 2011/0112759 | A1* | 5/2011 | Bast ............... G01C 21/3423 701/533 |
| 2011/0125666 | A1 | 5/2011 | Laurent et al. |
| 2014/0257697 | A1* | 9/2014 | Gishen ............ G01C 21/3423 701/537 |
| 2014/0343974 | A1 | 11/2014 | Graells et al. |
| 2015/0371157 | A1 | 12/2015 | Jaffe |
| 2016/0203422 | A1 | 7/2016 | Demarchi et al. |

FOREIGN PATENT DOCUMENTS

| | | |
|---|---|---|
| JP | 2013511095 | 3/2013 |
| JP | 2014032139 A | 2/2014 |
| JP | 2016045020 | 4/2016 |
| JP | 2017075967 A | 4/2017 |
| JP | 2018109621 A | 7/2018 |
| WO | 2005013234 A1 | 2/2005 |
| WO | WO2008142783 A1 | 11/2008 |

OTHER PUBLICATIONS

Artigues, Christian, Marie-josé Huguet, Fallou Gueye, Frédéric Schettini, and Laurent Dezou. State-Based Accelerations and Bidirectional Search for Bi-Objective Multi-Modal Shortest Paths, 2013. 2013.

Barrett, Chris, Riko Jacob, and Madhav Marathe. 'Formal-Language-Constrained Path Problems'. SIAM Journal on Computing 30 (2000): 200-0. 2000.

Bast, Hannah, Mirko Brodesser, and Sabine Stor. 'Result Diversity for Multi-Modal Route Planning'. In 13th Workshop on Algorithmic Approaches for Transportation Modelling, Optimization, and Systems, vol. 33 of OpenAccess Series in Informatics (QASIcs), pp. 123-136, Dagstuhl, 2013. 2013.

Bast, Hannah, Erik Carlsson, Arno Eigenwillig, Robert Geisberger, Chris Harrelson, Veselin Raychev, and Fabien Viger. 'Fast Routing in Very Large Public Transportation Networks Using Transfer Patterns'. In In Proceedings of the 18th Annual European Conference on Algorithms: Part I, ESA'10, 290-301. Springer-Vertag, 2010. 2010.

Bast, Hannah, Daniel Delling, Andrew V. Goldberg, Matthias Müller-hannemann, Thomas Pajor, Peter Sanders, Dorothea Wagner, and Renato F. Werneck. 'Route Planning in Transportation Networks', 2014. 2014.

Delling, Daniel, Julian Dibbelt, Thomas Pajor, Dorothea Wagner, and Renato F. Werneck. Computing Multimodal Journeys in Practice?, n.d. 2018.

Delling, Daniel, Thomas Pajor, and Renato F Werneck. 'Round-Based Public Transit Routing', n.d., 11. 2018.

Dibbelt, Julian, Thomas Pajor, Ben Strasser, and Dorothea Wagner. 'Intriguingly Simple and Fast Transit Routing'. In In SEA, vol. 7933 of LNCS, 43-54. Springer, 2013. 2013.

Dibbelt, Julian, Thomas Pajor, and Dorothea Wagner. User-Constrained Multi-Modal Route Planning, n.d. 2018.

Garey M. R. and D. S. Johnson. Computers and intractability: A guide to the theory of NP-completeness. Freeman, 1979. 1979.

Geisberger, Robert, Peter Sanders, Dominik Schultes, and Daniel Delling. 'Contraction Hierarchies: Faster and Simpler Hierarchical Routing in Road Networks'. In Experimental Algorithms, edited by Catherine C. McGeoch, 5038:319-33. Berlin, Heidelberg: Springer Bertin Heidelberg, 2008. https://doi.org/10.1007/978-3-540-68552-4_24. 2008.

Goldberg, Andrew V., and Chris Harrelson. 'Computing the Shortest Path: A Search Meets Graph Theory'. In Proceedings of the Sixteenth Annual ACM-SIAM Symposium on Discrete Algorithms, 156-165. SODA '05. Vancouver, British Columbia: Society for Industrial and Applied Mathematics, 2005 2005.

Hansen, Pierre, 'Bicriterion Path Problems'. In Multiple Criteria Decision Making Theory and Application, edited by Günter Fandel and Tomas Gal, 177:109-27. Berlin, Heidelberg: Springer Berlin Heidelberg, 1980. https://doi.org/10.1007/978-3-642-48782-8_9. 1980.

Idrí, Abdelfattah, Maríyem Oukarfi, Azedine Boulmakoul, Karine Zeitouni, and Ali Masri. 'A Distributed Approach for Shortest Path Algorithm in Dynamic Multimodal Transportation Networks'. Transportation Research Procedia 27 (2017): 294-300. https://doi.org/10.1016/j.trpro.2017.12.094. 2017.

Kirchler, Dominik. 'Efficient Routing on Multi-Modal Transportation Networks'. Phdthesis, Ecote Polytechnique X, 2013. https://pastel.archives-ouvertes.fr/pastel-00877450. 2013.

Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1, 2009): 431-44, https://doi.org/10.1127/1432-8364/2009/0031. 2009.

Liu, Xudong, Christian Fritz, and Matthew Klenk. 'On Extensibility and Personalizability of Multi-Modal Trip Planning', n.d., 7. 2018.

U.S. Appl. No. 16/853,914, filed Apr. 21, 2020, entitled, "Method for Computing an Itinerary From a Departure Location to an Arrival Location" 2020.

Moritz Baum, Valentin Buchhold, Jonas Sauer, Dorothea Wagner, and Tobias Zündorf. Unlimited transfers for multi-modal route planning: An efficient solution. In Proceedings of ESA 2019, to appear, 2019. 2019.

Vassilissa Lehoux and Darko Drakulic. Mode Personalization in Trip-Based Transit Routing. In Gianlorenzo D'Angelo and Twan Dollevoet, editors, 19th Workshop on Algorithmic Approaches for Transportation Modelling, Optimization, and Systems (ATMOS 2019), vol. 75 of OpenAccess Series in Informatics (OASIcs), Dagstuhl, Germany, 2019. Schloss Dagstuhl—Leibniz-Zentrum fuer Informatik. 2019.

Duc-Minh Phan and Laurent Viennot. Fast public transitrouting with unrestrict-edwalking through hub labeling. In Proceedings of the Special Event on Analysis of Experimental Algorithms (SEA2), Lecture Notes in Computer Science. Springer, 2019. 2019.

I'le De France Mobilités. Open data, https://www.iledefrance-mobilites.fr 2019.

Dorothea Wagner and Tobias Zu¨ndorf. Public Transit Routing with Unrestricted Walking, In Gianlorenzo D'Angelo and Twan Dollevoet, editors, 17th Workshop on Algorithmic Approaches for Transportation Modelling, Optimization, and Systems (ATMOS 2017), vol. 59 of OpenAccess Series in Informatics (OASIcs), pp. 7:1-7:14, Dagstuhl, Germany, 2017. Schloss Dagstuhl—Leibniz-Zentrum fuer Informatik. 2017.

U.S. Appl. No. 16/995,969, filed Aug. 18, 2020, entitled, "Method for Computing an Itinerary From a Departure Location to an Arrival Location" 2020.

English Translation of Abstract of Published Japanese Patent Application No. JP 2007-520685 (A) Jul. 26, 2007 2007.

English Translation of Abstract of Published Japanese Patent Application No. JP 2016-045020 (A) Apr. 4, 2016 2016.

English Translation of Abstract of Published Japanese Patent Application No. JP 2013-511095 (A) Feb. 28, 2013 2013.

U.S. Appl. No. 17/335,402, filed Jun. 1, 2021, entitled, "Method for Computing a Personalized Itinerary From a Departure Location to an Arrival Location" 2021.

Ulloa Luis, Lehoux Vassilissa, Rouiland Fréderic. Trip planning within a multimodal urban mobility, IET Intelligent Transport Systems, 12(2):87-92, 2018. 2018.

Witt, Sascha. 'Trip-Based Public Transit Routing'. ArXiv:1504.07149 [Cs] 9294 (2015): 1025-36. https://doi.org/10.1007/978-3-662-48350-3_85. 2015.

Witt, Sacha. Trip-based public transit routing using condensed search trees. In Marc Goerigk and Renato Werneck, editors, 16th

(56) References Cited

OTHER PUBLICATIONS

Workshop on Algorithmic Approaches for Transporation Modelling, Optimization, and Systems (ATMOS16), No. 10, 2016. 2016.
Bast, Hannah, Daniel Delling, Andrew Goldberg, Matthias Müller-Hannemann, Thomas Pajor, Peter Sanders, Dorothea Wagner, and Renato F. Werneck. 'Route Planning in Transporlation Networks'. ArXiv:1504.05140 [Cs], Apr. 20, 2015. http://arxiv.org/abs/1504.05140. 2015.
Web page: https://data.grandlyon.com/ Home • Métropolitan Data of the Grand Lyon.Pdf, n.d. 2018.
Web page : https://opendata.stif.info. 'Home page—Portail Open Data Île-de-France Mobilités—Open Data Île-de-France Mobilités. Pdf', n.d. 2018.
"General transit feed standard format reference documentation," https://developers.google.com/transit/gtfs/reference/ 2018.
E. Cohen, E. Halperin, H. Kaplan, and U. Zwick. Reachability and distance queries via 2-hop labels. SIAM Journal on Computing, 32(5):13381355, 2003 2003.
Daniel Delling, Thomas Pajor, and Renato F, Werneck. Round-based public transit routing. In Proceedings of the Fourteenth Workshop on Algorithm Engineering and Experiments (ALENEX), 2013. 2013.
Julian Dibbelt, Thomas Pajor, and Renato F. Werneck. Public transit labeling. In Bampis E., editor, Experimental Algorithms SEA 2015, vol. 9125 of Lecture Notes in Computer Science. Springer, 2015 2015.
Matthias Hertel Hannah Bast and Sabine Storandt. Scalable transfer patterns. In Proceedings of the Eighteenth Workshop on Algorithm Engineering and Experiments (ALENEX), 2016 2016.
Hannah Bast, Mirko Brodesser, and Sabina Storandt. Result Diversity for Multi-Modal Route Plan-ning. In Daniele Frigioni and Sebastian Stiller, editors, 13th Workshop on Algorithmic Approaches for Transportation Modelling, Optimization, and Systems, vol. 33 of OpenAccess Series in Infor¬matics (OASIcs), pp. 123-136, Dagstuhl, Germany, 2013. Schloss Dagstuhl—Leibniz-Zentrum fuer Informatik 2013.
I'le De France Mobilités. Open data, https://www.iledefrance-mobilites.fr 2018.
U.S. Appl. No. 16/830,609, filed Mar. 26, 2020, entitled, "Methods for Preprocessing a Set of Feasible Transfers for Computing Itineraries in a Multimodal Transportation Network" 2020.
U.S. Appl. No. 16/830,621, filed Mar. 26, 2020, entitled, "Method for Preprocessing a Set of Non-Scheduled Lines Within a Multimodal Transportation Network of Predetermined Stations and for Computing at Least One Itinerary From a Departure Location to an Arrival Location" 2020.
U.S. Appl. No. 16/700,096, filed Dec. 2, 2019, entitled, "Method for Computing at Least One Itinerary From a Departure Location to an Arrival Location" 2019.
Office Action from Japanese Patent Office for Japanese Patent Application No. 2020-093731 (Japanese copunter part to U.S. Appl. No. 16/830,621) dated Mar. 23, 2021 2021.
English Translation of Abstract of Published Japanese Patent Application No. JP 2014-032139 (A) 2014.
English Translation of Abstract of Published Japanese Patent Application No. JP 2017-075967 (A) 2017.
English Translation of Abstract of Published Japanese Patent Application No. JP 2018-109621 (A) 2018.
European Search Report for EP 19305687.6 (dated Jul. 25, 2019) Jul. 25, 2019.
European Search Report for EP 19305689.2 (dated Jul. 26, 2019) Jul. 26, 2019.

* cited by examiner

```
Input: Timetable data, footpath data, transfer set T
Output: Reduced transfer set T
for each trip t do
    τ_A(.) ← ∞                                                        ▷ Earliest arrival time at stops
    τ_C(.) ← ∞                                                        ▷ Earliest change time at stops
    for i ← |p⃗(t)| − 1, ..., 1 do
        τ_A(t@i) ← min(τ_A(t@i), τ_arr(t,i))
        τ_C(t@i) ← min(τ_C(t@i), τ_arr(t,i) + τ_fp(t@i, t@i))
        for each stop q ≠ t@i such that Δτ_fp(t@i, q) is defined do
            τ_A(q) ← min(τ_A(q), τ_arr(t,i) + τ_fp(t@i, q))
            τ_C(q) ← min(τ_C(q), τ_arr(t,i) + τ_fp(t@i, q))
        end for
        for each transfer t@i → u@j ∈ T do
            keep ← false
            for each stop u@k on trip u with k > j do
                keep ← keep ∨ τ_arr(u,k) < τ_A(u@k)
                keep ← keep ∨ τ_arr(u,k) + τ_fp(u@k, u@k) < τ_C(u@k)
                τ_A(u@k) ← min(τ_A(u@k), τ_arr(u,k))
                τ_C(u@k) ← min(τ_C(u@k), τ_arr(u,k) + τ_fp(u@k, u@k))
                for each stop q ≠ u@k such that Δτ_fp(u@k, q) is defined do
                    ρ ← τ_arr(u,k) + Δτ_fp(u@k, q)
                    keep ← keep ∨ (ρ < τ_A(q)) ∨ (ρ < τ_C(q))
                    τ_A(q) ← min(τ_A(q), ρ)
                    τ_C(q) ← min(τ_C(q), ρ)
                end for
            end for
            if ¬keep then
                T ← T \ {t@i → u@j}                                   ▷ No improvement: remove the transfer
            end if
        end for
    end for
end for
```

Figure 8

```
Input: Timetable data, transfer duration data
Output: Reduced transfer set 𝒯
𝒯 ← ∅
for each line L do
    𝒯(L) ← LINE_TRANSFERS(L)
    for each trip t of L do
        T ← ∅                                    ▷ Transfer set for each target line
        L_prev ← null
        for each transfer (i, L'@j, Δ) of 𝒯(L) do
            if L_prev ≠ L' or i_prev ≠ i then
                𝒯 ← 𝒯 ∪ T
                T ← ∅, L_prev = L'
                R(.) ← ∞                         ▷ Earliest destination trip at index j
            end if
            t' ← earliest trip of L' at j such that τ_dep(t', j) ≥ τ_arr(t, i) + Δ
            if T = ∅ then
                T(L') ← {t@i → t'@j}
                for each index j' ∈ [j ... |p⃗(L')| - 1] do
                    R(j') ← t'
                end for
            else
                if t' < R(j) then
                    T ← T ∪ {t@i → t'@j}
                    for each index j' ∈ [j ... |p⃗(L')| - 1] do
                        R(j') ← min{t', R(j')}
                    end for
                end if
            end if
        end for
        𝒯 ← 𝒯 ∪ T
    end for
end for
return 𝒯 procedure LINE_TRANSFERS(line L, transfer duration data)   ▷ Builds the line neighborhood
    for i ← |p⃗(L)| - 1, ..., 1 do
        for each stop q such that Δτ_fp(L@i, q) is defined do
            for each (L', j) such that q = L'@j do
                𝒯 ← 𝒯 ∪ (i, L'@j, Δτ_fp(L@i, L'@j))
            end for
        end for
    end for
    Sort 𝒯 first by target line, then by decreasing origin line index, then by increasing target line index,
    then by chosen sorting
    return 𝒯
end procedure
```

Figure 9

METHOD FOR COMPUTING AN ITINERARY FROM A DEPARTURE LOCATION TO AN ARRIVAL LOCATION

BACKGROUND

A journey planner (also called trip planner) is a solver used to determine an itinerary from a departure location (the origin) to an arrival location (the destination), using one or more transport modes, in particular public transportation modes (subway, tram, bus, etc.—the planner is said to be "multimodal" when covering several transportation modes and allowing intermodal transfers from one mode to another). Searches may be optimized on different criteria, for example fastest, shortest, least changes, cheapest. Searches may be constrained for example to leave or arrive at a certain time, to avoid certain waypoints, etc.

Public transport modes generally operate according to published schedules; given that public transport services only depart at specific times (unlike private modes of transportation such as driving, walking, or cycling, which may leave at any time), an algorithm must therefore not only find a path to a destination, but seek to optimize it so as to minimize the arrival time in this time-dependent setting.

One algorithm used to this end is the "Trip-Based Public Transit Routing" algorithm, which is a method based on iterations, similar to breadth-first search in a graph, where one iteration corresponds to taking a trip. It is disclosed in the document Sacha Witt. "Trip-based public transit routing." In N. Bansal and I. Finocchi, editors, ESA 2015, volume 9294 of Lecture Notes in Computer Science, Berlin, Heidelberg, 2015. Springer.

The Trip-Based Public Transit Routing algorithm is an algorithm for computing a Pareto front and a Pareto path per value in the Pareto front for two criteria in multimodal networks restricted to transit and walking between stations, considering an origin, a destination, and a start time.

The Trip-Based Public Transit Routing algorithm builds a graph representation of the transportation network, as illustrated in FIG. 2.

FIG. 2 illustrates the modeling of the network in the Trip-Based Public Transit Routing algorithm search phase. Public transit information is represented using a graph, whose vertices (or nodes) are the trips of the public transit network and those arcs are representing the possibility to transfer between two trips at given stops. FIG. 2 illustrates the modeling of a transfer 15 between a first trip 10 of a public transit network at station (stop) (i) and a second trip 20 of the public transit network at station (stop) (j). FIG. 2 further illustrates a second transfer 25 between the first trip 10 of the public transit network at station (stop) (u) and a third trip 30 of the public transit network at station (stop) (v). As illustrated in FIG. 2, node 11 corresponds to trip 10, node 21 corresponds to trip 20, and node 31 corresponds to trip 30.

As illustrated in FIG. 2, transfer 15 corresponds to arc 17 and transfer 25 corresponds to arc 27. It is noted that several feasible transfers are often possible between two trips.

The two criteria considered are: (1) Min arrival time (i.e., the earliest arrival time considering the start time); and (2) Min number of transfers (i.e., the minimum number of changes of transport mode, either within the same network—for instance from a subway line to another—or intermodally).

FIG. 3 illustrates a trip-based public transit routing process that utilizes a database 50 containing public transit routing information for a particular area, such as a city. A preprocessing process 51 constructs a set of feasible transfers between trips in the public transit network. A trip, in the Trip-Based Public Transit Routing algorithm, is an ordered list of arrival and departure times at stops/stations that will be fulfilled by a single vehicle. The trip, in the Trip-Based Public Transit Routing algorithm, corresponds to taking one vehicle of a line. A line is an ordered set of trips sharing the same sequence of stops visited by the vehicles corresponding to the trips and where trips do not undertake one another (the order of the arrival and departure times of the trip is the same for all the stops of the line).

As Illustrated in FIG. 3, a pruning process 53 prunes the set of feasible transfers between trips in the public transit network. The preprocessing and pruning of the possible transfers between trips build, for each trip, a neighborhood of reachable trips that will be as small as possible. For the algorithm to be correct, for each element in the Pareto front, there should be at least one solution in the Pareto set with this value such that all the transfers of this solution belong to the set. The pruning process 53 ensures the correction.

A search engine module 57 finds the Pareto front and one solution per element in the Pareto front 59 by performing an earliest arrival time query that consists in a simple breadth-first search like exploration in a time-independent network where the trips are the nodes of FIG. 2 and the possible transfers are the arcs of FIG. 2. So, for each iteration, one additional trip is taken in each solution to try and get to destination.

In the system, described above, with respect to FIGS. 2 and 3, the preprocessing phase becomes more time consuming when adding more modes to the transportation network or more personalization to the solution; for example, the preprocessing time can increase as much as three times when adding a feature as disclosed in the document Vassilissa Lehoux and Darko Drakulic. "Mode personalization in Trip Based Transit Routing", In Valentina Cacchiani and Alberto Marchetti-Spaccamela (Eds.), Proceedings of the 19th Symposium on Algorithmic Approaches for Transportation Modelling, Optimization, and Systems (ATMOS'19), OASICS Vol. 75, 2019.

While it is desirable to increase the multimodality and personalization of the trip itinerary generator, the preprocessing times need to be kept low in order to redo the preprocessing on a regular basis to update the process with real-time information.

Although the preprocessing time can be reduced by running the process in parallel or using more processors, reducing the number of computations will result lowering the execution time of the preprocessing for a given a set of resources.

Therefore, it is desirable for provide a preprocessing that reduces a number of computations, thereby reducing the processing time of the preprocessing.

BRIEF DESCRIPTION OF THE DRAWINGS

The drawings are only for purposes of illustrating various embodiments and are not to be construed as limiting, wherein:

FIG. 8 illustrates an algorithmic example of preprocessing a set of feasible transfers using arrival time-based pruning; and FIG. 9 illustrates another algorithmic example of building and preprocessing a set of feasible transfers using line-based pruning.

DETAILED DESCRIPTION OF THE DRAWINGS

Figure 1:
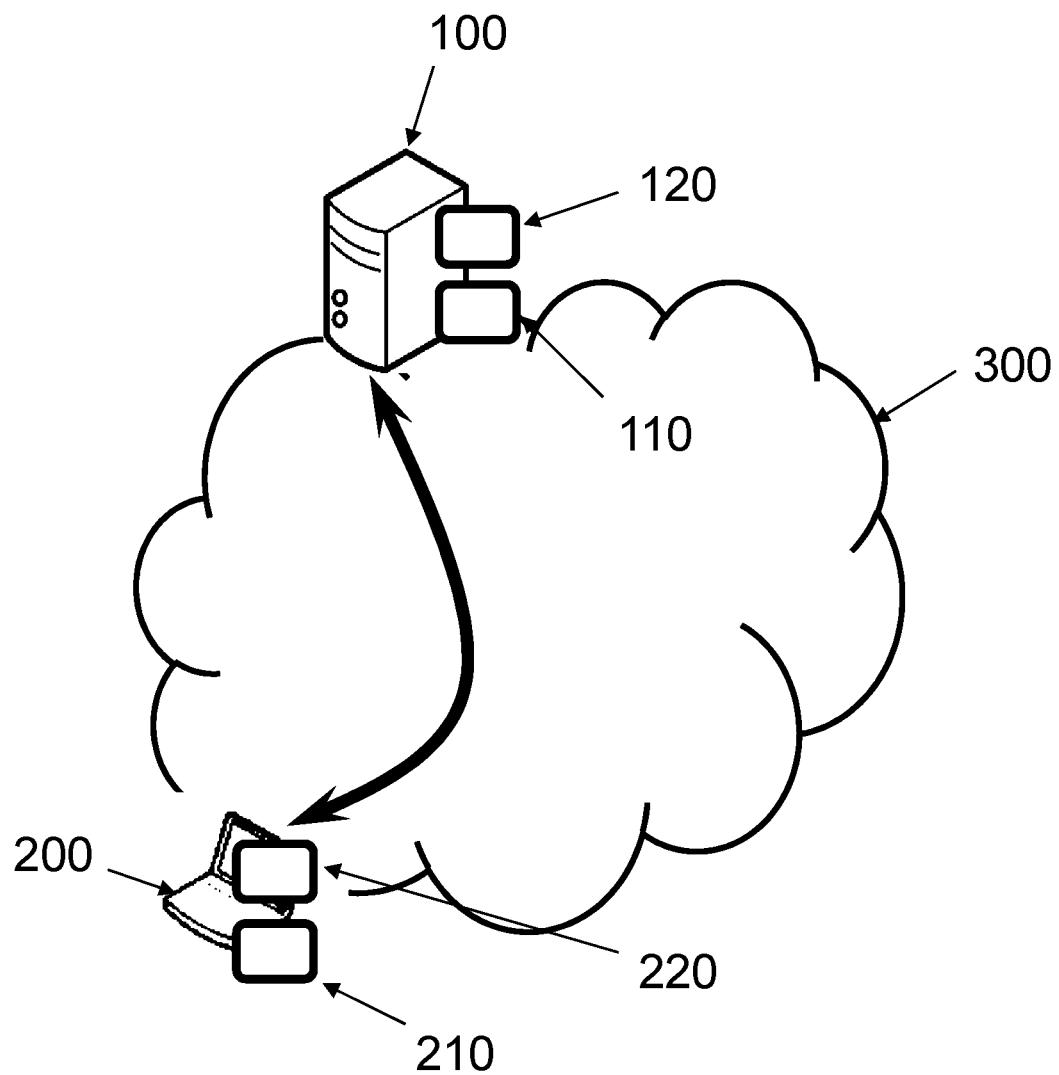
FIG. 1 illustrates an example of architecture of a system for computing an itinerary from a departure location to an arrival location.
Figure 2:
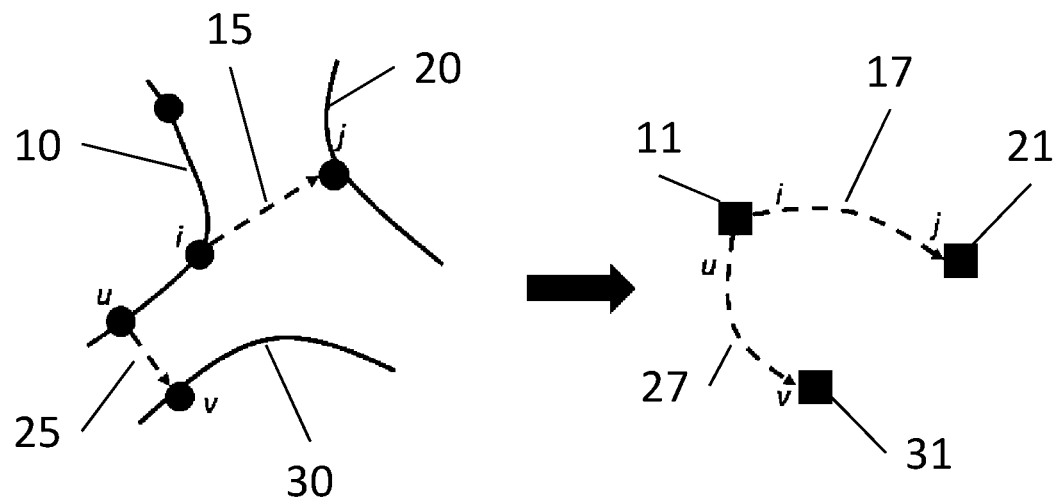
FIG. 2 illustrates a data model used by the search query algorithm.
Figure 3:
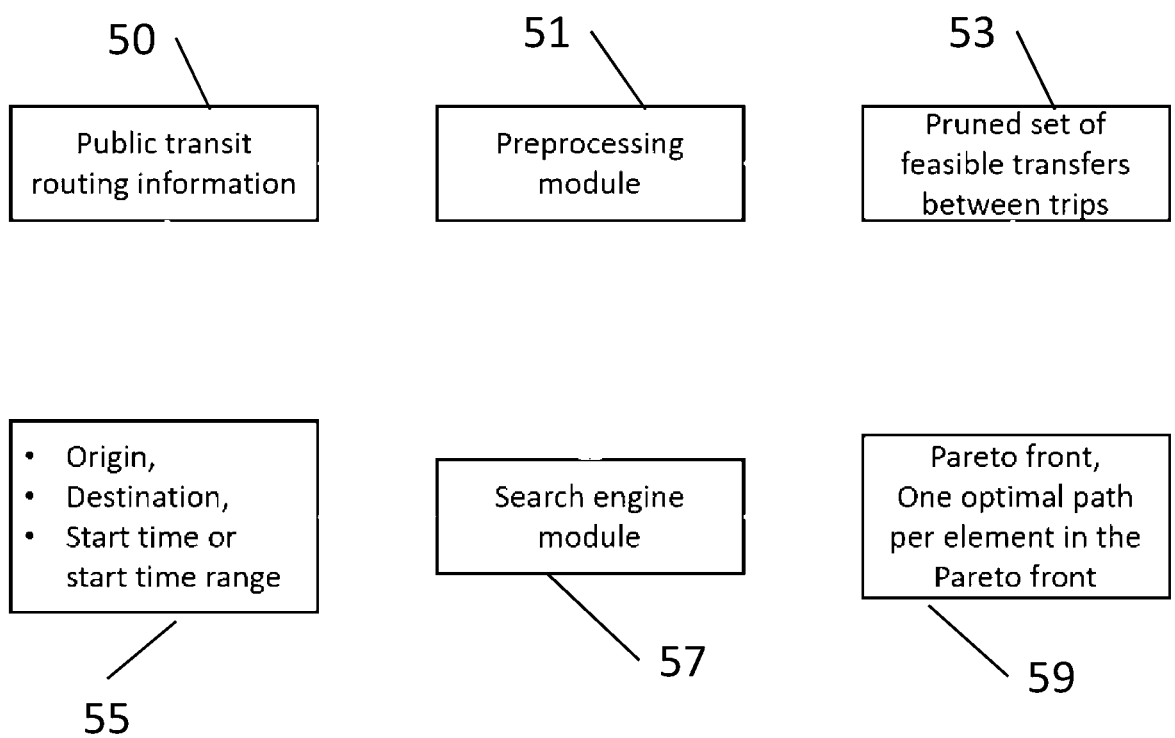
FIG. 3 illustrates a block diagram of a trip-based public transit routing process.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

A method for computing at least one itinerary from a departure location to an arrival location will be described below.

In the description below, the departure and arrival locations are geographical locations, typically locations on a map as defined by an address, a point of interest, coordinates, etc.

In the description below, the determined itineraries are preferably the optimal ones (or at least close to the optimal ones; i.e., approximations of the optimal ones) according to at least one criterion such as the arrival time (which should be the earlier), the duration of the itinerary (which should be the lowest), the departure time (which should be the latest), the length of the itinerary (which should be the shortest), the number of transfers (which should be the lowest), the price (which should be the lowest), etc.

Generally speaking, a "cost" of the itinerary can be computed according to a given cost function, the cost being minimized.

In a preferred example of the Trip-Based Public Transit Routing algorithm that will be detailed in the following description, two criteria are co-considered: (1) arrival time and (2) the number of transfers.

Furthermore, each itinerary comprises a multimodal transportation network of predetermined stations. The multimodal transportation network is preferably a network of public transportation modes, in particular "scheduled" transportation modes; i.e., following a line (a predetermined sequence of stations) and of which timetables are known.

Examples of scheduled public transportation modes include bus, metro, tramway, train, water shuttle, carpooling, etc. It is to be noted that the multimodal transportation network might further comprise non-scheduled transportation modes such as on-demand bus, ride-hailing, or even bike sharing (wherein the users can simply take a bike for going from a station to another without any restriction), but advantageously only walking and scheduled public transportation modes are hereby involved in the multimodal transportation network.

By station, or "stop," it is meant a facility at a given location wherein at least one of the transportation modes of the multimodal transportation network regularly stops to load or unload passengers, for example a bus station, a metro station, a train station, etc.

A travel between two consecutive stations during a trip is called "connection." It is associated with a departure time from the first stop and an arrival time at the second stop.

A trip is a set of ordered arrival/departure times at stations/stops for a single vehicle.

A transfer corresponds to leaving one trip at its $i^{th}$ stop and taking (starting) a second trip at its $j^{th}$ stop.

In the following description, the multimodal network is restricted to a public transit network and walking between stations.

The method, described below, may be implemented within an architecture such as illustrated in FIG. 1, by means of a server 100 and/or a client 200.

Each of these devices 100, 200 are typically connected to an extended network 300 such as the Internet for data exchange. Each one comprises data processors 110, 210, and optionally memory 120, 220 such as a hard disk.

More precisely, the user generally uses a client device 200 of the smartphone type, for inputting a request for itineraries (are inputted the departure location, the arrival location, and a departure time or range thereof or an arrival time or range thereof). The request may be either directly processed by the client 200, or transmitted to the server 100 for being processed there. The described methodology is not limited to any specific implementation.

It is to be noted that even if the method is performed by the client device 200, the server 100 can still be called for performing any of the subroutines.

In the description below, the following notations will be utilized.

$t@i$ represents the pair $(t, i)$ where t is a trip and i is an index in its stop sequence; i.e., $t@i$ represents the $i^{th}$ stop of trip t. If several identical stops in the sequence (i.e. the trip return at a previously visited stop), $t@i$ refers to the one in the $i^{th}$ position, that is the index of the stop is also referenced in the notation.

$\vec{p}(t)=(t@1, t@2, \ldots)$ is the stop sequence of trip t.

$\tau_{arr}(t,i)$ is the arrival time and $\tau_{dep}(t,i)$ is the corresponding departure time at $t@i$ of trip t.

A line L is an ordered set of trips $t_0, t_1, t_2, \ldots$, such that all trips of the line have the same stop sequence (denoted $\vec{p}(L)$) and do not overtake one another. For two trips of the same stop sequence $\vec{p}$, the relationship $\leq$ is defined by:

$$t \leq t' \Leftrightarrow \forall i \in \vec{p}, \tau_{arr}(t,i) \leq \tau_{arr}(t',i)$$

For two trips of the same stop sequence $\vec{p}$, the relationship $<$ is defined by:

$$t \leq t' \Leftrightarrow t \leq t' \text{ and } \exists i \in [0,1, \ldots |\vec{p}|-1], \tau_{arr}(t,i) < \tau_{arr}(t',i)$$

$\Delta\tau_{fp}(p,q)$ defines the transfer duration (amount of time) between stop p and stop q.

$\Delta\tau_{fp}(p,p)$ defines the minimum change time between two trips at stop p.

$t@i \rightarrow u@j$ denotes a transfer between trip t at the $i^{th}$ stop and trip u at its $j^{th}$ stop.

$t@i \rightarrow u@j$ is feasible if and only if $\Delta\tau_{fp}(t@i, u@j)$ is defined and $$\tau_{arr}(t,i)+\Delta\tau_{fp}(t@i,u@j) \leq \tau_{dep}(u,j)$$

T is the set of all feasible transfers.

The set of feasible transfers for a trip t contains all transfers from the $i^{th}$ stop, $t@i$, of trip t to the $j^{th}$ stop, $u@j$, of trip u such that a user can reach stop u@j on time to get trip u after unboarding t at stop t@i.

Although the above defined set of feasible transfers is correct, using the complete set of feasible transfers between trips during the search phase would not be beneficial because the above defined set of feasible transfers would be large and the non-useful arcs would negatively impact the exploration time (and hence the query time).

For instance, if all the possible transfers between one trip and a different line are considered, only transfer to the earliest trip (minimum trip regarding the line order) would be relevant for queries building the Pareto front and one solution per element in the Pareto front for minimizing the arrival time and number of transfers.

One approach to diminish the negative impact on the query times is to prune the set of feasible transfers while keeping all the transfers that belong to at least one optimal path per value in the Pareto front.

An example of a trip-based pruning method, as proposed in Sacha Witt. "Trip-based public transit routing." In N. Bansal and I. Finocchi, editors, ESA 2015, volume 9294 of Lecture Notes in Computer Science, Berlin, Heidelberg, 2015. Springer, for preprocessing a set of feasible transfers is illustrated in FIG. 8.

As shown in FIG. 8, each trip t is processed in turn, and each stop i of its sequence, starting by the last one. The process determines if taking a neighboring trip u at stop j, leaving t at stop i, can improve the arrival ($\tau_A$) or change ($\tau_C$) times (minimum time at which it will be possible to take a new trip) at any stop of the network, compared to the previous transfers processed.

If leaving t at stop i and taking u at stop j can improve the arrival ($\tau_A$) or change ($\tau_C$) times, the transfer is kept.

If leaving t at stop i and taking trip u at stop j cannot improve the arrival ($\tau_A$) or change ($\tau_C$) times, the transfer is dropped because either the transfer cannot be part of any optimal solution or taking a later transfer or transferring to another trip will lead to at least as good arrival and/or change times.

The above pruning method reduces the query time, which in turns reduces the time needed to provide the user with a set of possible itineraries.

If the number of transfers in the built set of feasible transfers is reduced, the processing time in the search phase is reduced. For example, the preprocessing step, described in FIG. 8, reduces the transfer set in way that ensures that for each element in the Pareto set, at least one solution with this value can be constructed using transfers from the reduced set. However, the preprocessing phase for the process illustrated in FIG. 8 is costly because computing all the possible arrival and change times for all the reachable stops for each transfer is costly (in terms of execution times). Hence, applying another faster pruning phase, as discussed below, that removes some transfers before applying pruning of FIG. 8 can reduce the preprocessing computation times.

FIG. 9 illustrates an algorithmic example building a reduced correct set of feasible transfers, as a first preprocessing step, based on lines to reduce the number of transfers.

As a second preprocessing step, the transfer pruning based on trips (i.e. on arrival and change times at stop taking given trips), as discussed above with respect to FIG. 8, can be applied. Since the first preprocessing step of FIG. 9, has created an initial transfer set that is smaller, this second preprocessing step will be significantly less expensive computationally than with the complete transfer set and total preprocessing time is reduced.

In the proposed line-based pruning, for each line L, the building of the set of feasible transfers first computes all the lines L' that can be reached by transfer; i.e., such that $\exists (i,j) \in [1 \ldots |\vec{p}(L)|-1] \times [0 \ldots |\vec{p}(L')|-2]$, $\Delta\tau_{fp}(L@i, L'@j)$ is defined.

It is noted that a transfer is not performed from the first stop of a trip or to the last stop of a trip.

When $\Delta\tau_{fp}(L@i, L'@j)$ is defined, (i, L'@j, $\Delta\tau_{fp}(L@i, L'@j)$) is added to the list of possible transfers for L.

Figure 4:
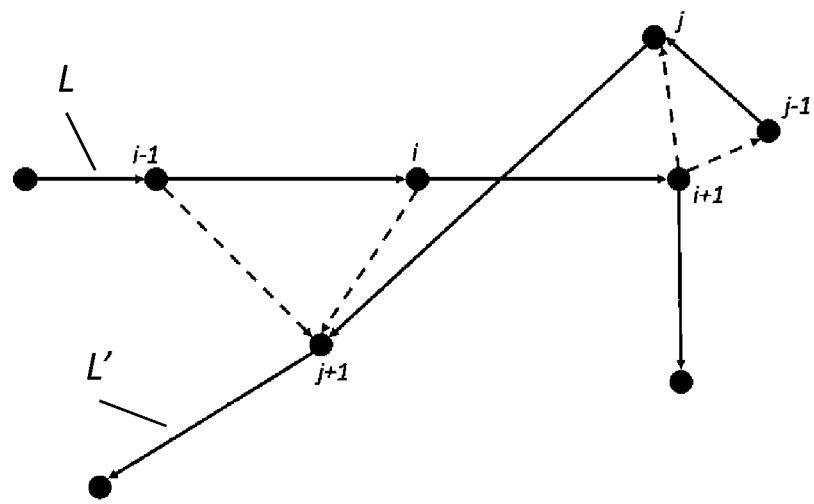
FIG. 4 illustrates several transfers being possible from line L to line L'.

If several transfers are possible from L to L', as illustrated in FIG. 4, some pruning can be performed directly in the set of transfers, as will be described in more detail below.

Upon building, for each line L and set of possible transfers T(L), the set is sorted by destination line, then in case of ties by decreasing origin line index, then in case of ties sorted by increasing destination line index and then in case of ties, sorted by other criteria such as transfer duration, waiting time, etc.

To compute a correct reduced set of feasible transfers for a trip t of line L, for each target line L', all the transfers of T(L) are considered in order, starting with the highest index i such that (i, L'@j, $\Delta\tau_{fp}(L@i,L'@j)$)∈T(L). If (i, L'@j, $\Delta\tau_{fp}(L@i,L'@j)$)∈T (L) exists, the earliest trip t' of L' such that transfer t@i→t'@j is feasible is determined. The transfer t@i→t'@j to the determined trip t' of L' is saved in the set T(t, L') of the transfers of trip t to line L'. In order to avoid adding dominated transfers, the earliest trip that can be caught at each stop of L' is recorded. This is denoted by R(j), the earliest trip caught at j using the transfers that are in a set of transfers, T(t, L'), the value being hence updated during the preprocessing. The sorting ensures that no previously added transfer can be dominated by a later added transfer.

The next transfer (k, L'@l, $\Delta\tau_{fp}(L@k, L'@l)$) of T(L) to line L' is now considered.

Suppose there exists again an earliest trip $t'_l$ of L' such that transfer t@k→$t'_l$@l is feasible.

To decide if this transfer is to be added or not to the set of transfers from trip t to line L', denoted by T(t, L'), it is determined if taking $t'_l$ at l can improve arrival times over the transfers already in T(t, L'). For this to be true, t, must be the earliest trip taken at stop l of the sequence $\vec{p}(L')$.

Since the transfers of L' are sorted, for any previous transfer t@i→u@j of T(t, L'), is such that k≤i and if k=i, j≤l. Hence, the new transfer cannot dominate a previously added transfer. It can nonetheless improve arrival times over previous entries of T(t, L'), if $t'_l$<R(l) is verified. In the case where R(l)=$t'_l$, a previously added transfer is equivalent in terms of arrival times at that stop. For strictly equivalent entries, the order in which they will be processed is determined by the initial sorting of T(L). The sorting of T(L) is hence chosen to favor the solutions that are the most relevant for the application; for example, the one minimizing the transfer duration in case of equality (transfer duration as a fourth sorting criterion for T(L)). Whatever the sorting choice, the previous entry in case of equality is kept.

To test the preprocessing speed, three data sets of different size and density were used, data associated with Lyon, France (TCL), data associated with Ile-De-France (IDFM), and data associated with Korea.

The nature of the data is set forth in Table 1.

TABLE 1

| Data set | # stops | # trips | # lines | # foot paths | # connections |
|---|---|---|---|---|---|
| TCL | 4,564 | 41,812 | 578 | 87,052 | 892,419 |
| IDFM | 42,325 | 319,151 | 1,869 | 846,246 | 7,031,782 |
| Korea | 180,948 | 446,741 | 31,708 | 4,195,659 | 22,346,975 |

In the testing, the one step conventional preprocessing, that relies only on the trip-based checking of arrival and change time is applied directly on the set of all possible transfers (conventional approach). In the line-based approach, the reduction of the transfer set by the above line-based approached is applied as a first preprocessing step, while a second preprocessing step is the conventional preprocessing applied to the resulting reduced transfer set (line-based approach).

In the testing of process of the line-based preprocessing, the process does not include the sorting of the transfers as a preliminary step and hence the dominance between the transfers of T is checked at each insertion. This testing does not include the pruning discussed below.

The following tables show the mean preprocessing time, for each data set, using the conventional approach versus the line-based approach. More specifically, Table 2 shows the mean processing time for the TCL data; Table 3 shows the mean processing time for the IDFM data; and Table 4 shows the mean processing time for the Korea data.

TABLE 2

| Approach | # trips | # kept transfers | # removed transfers | mean time (s) |
|---|---|---|---|---|
| Conventional | 41,812 | 6,039,386 | 68,531,888 | 99 |
| Line Based | 41,812 | 5,823,732 | 68,746,341 | 26 |

TABLE 3

| Approach | # trips | # kept transfers | # removed transfers | mean time (s) |
|---|---|---|---|---|
| Conventional | 319,151 | 108,737,312 | 1,344,473,272 | 324 |
| Line Based | 319,151 | 103,974,473 | 1,349,236,111 | 106 |

TABLE 4

| Approach | # trips | # kept transfers | # removed transfers | mean time (s) |
|---|---|---|---|---|
| Conventional | 446,741 | 259,846,519 | 3,230,177,062 | 1,367 |
| Line Based | 446,741 | 241,884,705 | 3,248,136,155 | 455 |

In addition to building a set of feasible transfers based upon lines, further pruning processes can be utilized to reduce the size of the set of transfers for a given line. One such pruning process is a line version of U-turn removal. Another pruning process is based upon two stops from the origin line enabling a transfer to the same stop of the target line. A third pruning process is based upon a stop from the origin line enabling a transfer to two different stops of the target line.

Figure 5:
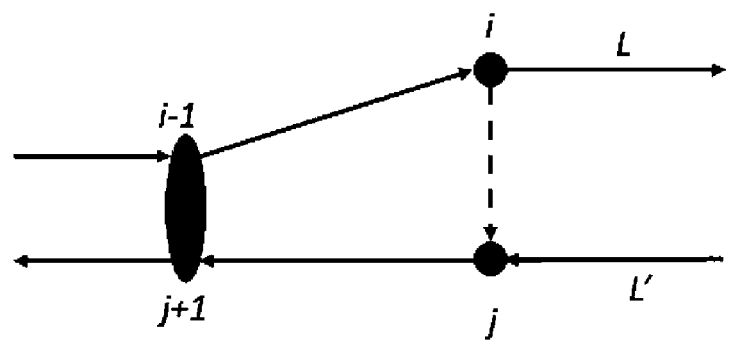
FIG. 5 illustrates a U-turn transfer, that is a transfer getting you back to the previous stop in the trip/line.

The first pruning process is applied to a situation, as illustrated in FIG. 5.

In the first pruning process (a line version of U-turn removal), if $(i, L'@j, \Delta\tau_{fp}(L@i, L@j))$ is defined for a line L, and $L'@(j+1)=L@(i-1)$ (as illustrated in FIG. 5), transfer $(i, L'@i, \Delta\tau_{fp}(L@i, L'@_j))$ can be removed from the set of feasible transfers if for all trip t of L, wherein t' is the earliest trip from L' that can be caught at j after $\tau_{arr}(t,i)+\Delta_{fp}(L@i, L'@j)$, $$\tau_{arr}(t,i-1)+\Delta\tau_{fp}(L@(i-1),L'@(j+1))<\tau_{arr}(t',j+1)$$

It is true if:

$$\tau_{arr}(t,i-1)+\Delta\tau_{fp}(L@(i-1),L'@(j+1))<(\tau_{arr}(t',j+1)-\tau_{dep}(t',j))+\tau_{arr}(t,i)+\Delta\tau_{fp}(L@i,L'@j)$$

The following condition is sufficient:

$$\Delta\tau_{fp}(L@(i-1), L'@(j+1)) < \min_{t \in L}\{\tau_{arr}(t, i) - \tau_{arr}(t, i-1)\} + \min_{t' \in L'}\{\tau_{arr}(t', j+1) - \tau_{dep}(t', j)\} + \Delta\tau_{fp}(L@i, L'@j)$$

The following condition is also sufficient:

$$\Delta\tau_{fp}(L@(i-1),L'@(j+1)) \leq \Delta\tau_{fp}(L@i,L'@j)$$

Figure 6:
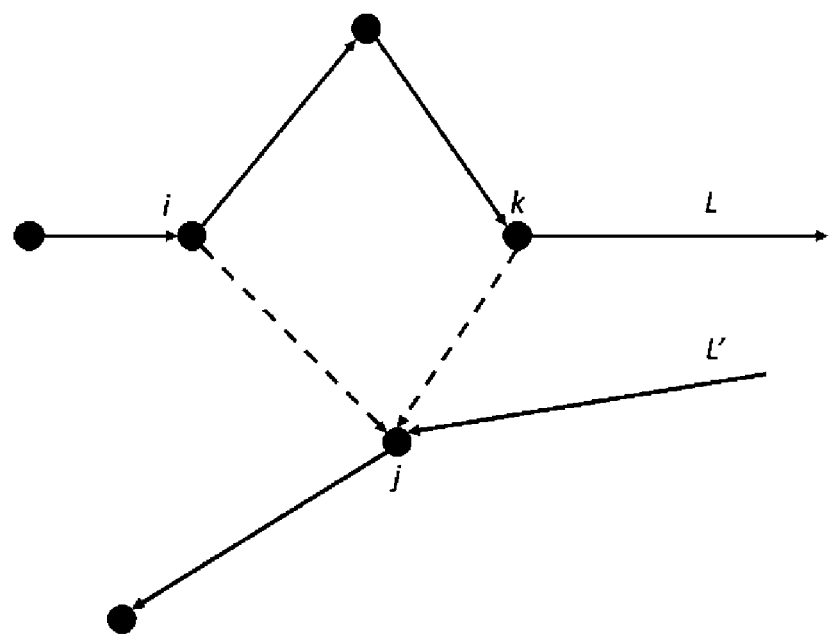
FIG. 6 illustrates two stops from the origin line enabling a transfer to the same stop of the target line.

The second pruning process is applied to a situation, as illustrated in FIG. 6.

In the second pruning process (two stops from the origin line enabling a transfer to the same stop of the target line), if transfers $(i, L'@j, \Delta\tau_{fp}(L@i, L'@j))$ and $(k, L@j, \Delta\tau_{fp}(L@k, L'@j))$ are defined for a line L, with k>i (as illustrated in FIG. 6), transferring from L@i rather than from L@k can be interesting only if transferring from L@i makes it possible to catch an earlier trip than transferring at L@k (otherwise, only the transfer from L@k is kept). For a given origin trip t of L, it will not be the case if $\tau_{arr}(t,k)+\Delta\tau_{fp}(L@k, L'@j) \leq \tau_{arr}(t,i)+\Delta\tau_{fp}(L@i, L'@j)$. Hence transfer $(i, L'@j, \Delta\tau_{fp}(L@i, L'@j))$ can be pruned if:

$$\max_{t \in L}(\tau_{arr}(t, k) - \tau_{arr}(t, i)) + \Delta\tau_{fp}(L@k, L'@j) \leq \Delta\tau_{fp}(L@i, L'@j)$$

Figure 7:
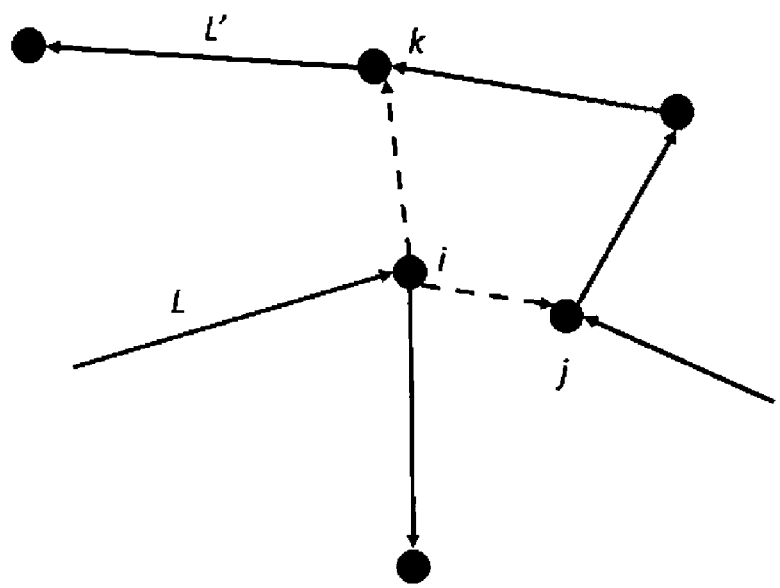
FIG. 7 illustrates a stop from the origin line enabling a transfer to two different stops of the target line.

The third pruning process is applied to a situation, as illustrated in FIG. 7.

In the third pruning process (a stop from the origin line enabling a transfer to two different stops of the target line), if transfers $(i, L'@j, \Delta\tau_{fp}(L@i, L'@j))$ and $(i, L'@k, \Delta\tau_{fp}(L@i, L'@k))$ are defined, with k>j (as illustrated in FIG. 7), transfer $(i, L'@k, \Delta\tau_{fp}(L@i, L'@k))$ can be interesting only if transferring to L'@k instead of L'@j can make the user able to catch an earlier trip after alighting a trip of L at i. It will not be true in particular if you cannot even get the same trip as with the previous transfer. So, the transfer $(i, L'@k, \Delta\tau_{fp}(L@i, L'@k))$ can be pruned if the below equation $$\Delta\tau_{fp}(L@i, L'@j) + \max_{t \in L'}\{\tau_{dep}(t, k) - \tau_{dep}(t, j)\} < \Delta\tau_{fp}(L@i, L'@k)$$

is verified.

Or if the below equation $$\Delta\tau_{fp}(L@i, L'@j) + \sum_{m=j}^{k-1}\max_{t \in L'}\{\tau_{dep}(t, m+1) - \tau_{dep}(t, m)\} < \Delta\tau_{fp}(L@i, L'@k)$$

is verified.

It is noted that more complicated pruning methods can be implemented based on maximum and minimum times between two stops of a line over the different trips, such as comparing transfers where both origin and destination indices are different.

In summary, as described above, a line-based preprocessing stage is proposed to build a correct set of feasible transfers for multimodal routing computations based on a trip-transfer graph model, such as in the Trip Based Public Transit Routing algorithm.

In an alternate embodiment, the preprocessed set of feasible transfers may be used for constructing and evaluating time tables (e.g., for transit bus lines). Advantageously, such time tables constructed using a set of feasible transfers may be organized to avoid long waiting times between trips, and evaluated for robustness in the event of delays so that missed transfers may be minimized.

In yet another embodiment, the preprocessed set of feasible transfers may be used for managing transportation network resources (e.g., to assist in deciding which vehicles along a line should wait in the event some vehicles along the line are delayed).

The line based preprocessing stage builds a set of feasible transfers that is about ⅕ of the size of the complete set of feasible transfers, if only transfer to the earliest trip of each line is considered when a transfer is feasible between two lines. This line-based preprocessing stage builds a correct set of feasible transfers that can be further reduced using the above described pruning processes.

An arrival and change time update-based pruning process can then be applied to the correct set of feasible transfers to reduce it further. The preprocessing time of this additional pruning is reduced compared to the same pruning applied to the set of all feasible transfers as proposed in Sacha Witt. "Trip-based public transit routing." In N. Bansal and I. Finocchi, editors, ESA 2015, volume 9294 of Lecture Notes in Computer Science, Berlin, Heidelberg, 2015. Springer.

In addition, the number of transfers in the final reduced set is reduced as well, as demonstrated above, which reduces the processing time to generate possible itineraries.

In summary, a method creates a reduced set of feasible transfers $T(t, L')$ for a trip t of line L, for each target line L' from a set of all transfers from line L to all other lines, by (a) computing, for each origin line L, feasible transfers between stations of the origin line L and a destination line L'; (b) sorting the computed feasible transfers to create a transfer set $T(L)$; (c) determining, for each trip t of origin line L, and for each transfer in the transfer set $T(L)$, an earliest trip t' of L' wherein the transfer is feasible; and (d) adding, for each trip t of origin line L, the determined transfer from t to t' to the reduced set of feasible transfers $T(t,L')$ when trip t' is the only destination trip of the transfers in the reduced set of feasible transfers $T(t,L')$ passing at the destination station and when it is earlier than all the previous destination trips of the transfers in the reduced set of feasible transfers $T(t, L')$ passing by the destination station.

The method may preprocess, using $T(t)=U_L T(t,L')$, the reduced set of feasible transfers $T(t, L')$ within the multimodal transportation network so as to obtain a subset of feasible transfers $\overline{T}(t)$.

The method may output the reduced set of feasible transfers $T(t, L')$ for computing at least one itinerary in the multimodal transportation network.

The method may determine a set of possible initial trips as a function of the departure location, and a set of possible final trips as a function of the arrival location, in the multimodal transportation network; and perform a routing optimization algorithm so as to build, among the itineraries having a main part from an initial trip belonging to the set of possible initial trips to a final trip belonging to the set of possible final trips, at least one optimal itinerary according to the earliest arrival time and the number of transfers or the latest departure time and the number of transfers.

The method may determine a set of possible initial trips as a function of the departure location, and a set of possible final trips as a function of the arrival location, in the multimodal transportation network; and perform a routing optimization algorithm so as to build, among the itineraries having a main part from an initial trip belonging to the set of possible initial trips to a final trip belonging to the set of possible final trips, at least one optimal itinerary according to the earliest arrival time and the number of transfers or the latest departure time and the number of transfers, when considering only trips from the set of possible trips using the selected transportation modes, and only transfers from the reduced set of feasible transfers between considered trips.

The routing optimization algorithm may compute the Pareto front.

The routing optimization algorithm may compute at least one optimal solution per element in the Pareto front for the earliest arrival time and number of transfers or latest departure time and number of transfers in multimodal networks by taking one additional trip of the set of the selected modes at each iteration based on the precomputed transfer set.

A transfer $(i, L'@j, \Delta\tau_{fp}(L@i, L'@_j))$, for line L, from the reduced set of feasible transfers $T(L)$ may be removed when for all trips t, if t' is the earliest trip from line L' such that the transfer from trip t at $t@(i-1)$ to trip t' at $t'@(j+1)$, $\tau_{arr}(t,i-1)$ $\Delta\tau_{fp}(L@(i-1), L'@(j+1))<\tau_{arr}(t',j+1)$ is verified.

A transfer $(i, L'@j, \Delta\tau_{fp}(L@i, L'@_j))$, for line L, from the reduced set of feasible transfers $T(L)$ may be removed when for all trips t, if t' is the earliest trip from line L' such that the transfer from trip t at $t@(i-1)$ to trip t' at $t'@(j+1)$, $\tau_{arr}(t,i-1)+\Delta\tau_{fp}(L@(i-1), L'@(j+1))<\tau_{arr}(t',j+1)-\tau_{dep}(t',j))+\Delta\tau_{fp}(L@i, L'@j)$ is verified.

The method may output the subset of feasible transfers $\overline{T}(t)$ for computing at least one itinerary in the multimodal transportation network.

The computed feasible transfers may be sorted by decreasing origin line index.

If there are tied computed feasible transfers in the decreasing origin line index sorting, the tied computed feasible transfers may be sorted by increasing destination line index.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for building at least one optimal itinerary for use by a user to plan a trip travelling in a multimodal transportation network according to the earliest arrival time and the number of transfers in the multimodal transportation network or the latest departure time and the number of transfers in the multimodal transportation network by creating a set of feasible transfers $T(t, L')$ for a trip t of line L, for each target line L' from a set of all transfers from line L to all other lines to determine an itinerary from an origin to a destination, comprising:

(a) electronically computing, using an electronic processor and electronic memory, for each origin line L, a set of feasible transfers between stations of the origin line L and a destination line L' such that when $\Delta T_{fp}$(L@i, L'@j) is defined, (i, L'@j, $\Delta T_{fp}$(L@i,L'@j)) is added to the set of feasible transfers for L, i being an index in a stop sequence, L@i being a stop along destination line L, L'@j being a stop along destination line L', $\Delta T_{fp}$(L@i,L'@j) being a transfer duration between stop L@i and stop L'@i, (b) electronically sorting such that a previously added transfer is prevented from being dominated by a later added transfer, using an electronic processor and electronic memory, by destination line L', the computed set of feasible transfers to create an ordered transfer set T (L), the computed set of feasible transfers being electronically sorted by decreasing origin line index;

(c) electronically determining, using an electronic processor and electronic memory, for each trip t of the origin line L, and for each transfer in the ordered transfer set T (L), an earliest trip t' of L' wherein the transfer is feasible;

(d) electronically adding, using an electronic processor and electronic memory, for each trip t of the origin line L, the determined transfer from t to t' to the set of feasible transfers T (t, L') (i) when trip t' is an only destination trip of the transfers in the set of feasible transfers T (t, L') passing at a destination station and (ii) when trip t' is earlier than all previous destination trips of the transfers in the set of feasible transfers T (t, L') passing by the destination station;

(e) electronically determining, using an electronic processor, electronic memory, and the set of feasible transfers T (t, L'), a set of possible initial trips as a function of a departure location, and a set of possible final trips as a function of an arrival location, in a multimodal transportation network; and (f) electronically performing, using an electronic processor and electronic memory, a routing optimization algorithm to electronically compute a Pareto front, said routing optimization algorithm, using the computed Pareto front, building, among itineraries having a main part from an initial trip belonging to the set of possible initial trips to a final trip belonging to the set of possible final trips, at least one optimal itinerary according to the earliest arrival time and the number of transfers or the latest departure time and the number of transfers, when considering only trips from the set of possible trips using selected transportation modes, and only transfers from the set of feasible transfers between considered trips;

wherein said electronically computing, for each origin line L, feasible transfers between stations of the origin line L and a destination line L' and said electronically sorting the computed feasible transfers to prevent a previously added transfer from being dominated by a later added transfer minimizes a number of electronic computations needed for determining the set of feasible transfers T (t, L').

2. The method as claimed in claim 1, further comprising:
(f) electronically preprocessing, using an electronic processor and electronic memory, using T(t)=U$_L$T(t, L'), the set of feasible transfers T (t, L') for each destination line L' within a multimodal transportation network so as to obtain a subset of feasible transfers $\bar{T}$(t).

3. The method as claimed in claim 1, further comprising:
(e) electronically outputting, using an electronic processor and electronic memory, the set of feasible transfers T (t, L') for computing at least one itinerary in a multimodal transportation network.

4. The method as claimed in claim 2, further comprising:
(f) electronically outputting, using an electronic processor and electronic memory, the subset of feasible transfers $\bar{T}$(t) for computing at least one itinerary in a multimodal transportation network.

5. The method according to claim 1, wherein the routing optimization algorithm electronically computes, using an electronic processor and electronic memory, at least one optimal solution per element in the computed Pareto front for the earliest arrival time and number of transfers or latest departure time and number of transfers in multimodal networks by taking one additional trip of the set of the selected modes at each iteration based on the precomputed transfer set.

6. The method according to claim 3, wherein the routing optimization algorithm electronically computes, using an electronic processor and electronic memory, at least one optimal solution per element in the computed Pareto front for the earliest arrival time and number of transfers or latest departure time and number of transfers in multimodal networks by taking one additional trip of the set of the selected modes at each iteration based on the precomputed transfer set.

7. The method according to claim 3, wherein the routing optimization algorithm electronically computes, using an electronic processor and electronic memory, at least one optimal solution per element in the computed Pareto front for the earliest arrival time and number of transfers or latest departure time and number of transfers in multimodal networks by taking one additional trip of the set of the selected modes at each iteration based on the precomputed transfer set.

8. The method according to claim 1, wherein a transfer (i, L'@j, $\Delta t_{fp}$(L@i, L'@j)), for line L, from the set of feasible transfers T (L) is electronically removed, using an electronic processor and electronic memory, when for all trips t, if t' is the earliest trip from line L' such that the transfer from trip t at t@(i−1) to trip t' at t'@(j+1), $T_{arr}$(t,i−1)+$\Delta T_{fp}$(L@(i−1), L'@(j+1)<$T_{arr}$(t',j+1) is verified.

9. The method according to claim 1, wherein a transfer (i, L'@j, $\Delta t_{fp}$(L@i, L'@j)), for line L, from the set of feasible transfers T (L) is electronically removed, using an electronic processor and electronic memory, when for all trips t, if t' is the earliest trip from line L' such that the transfer from trip t at t@(i−1) to trip t' at t'@(j+1), $\tau_{arr}$(t,i−1)+$\Delta\tau_{fp}$(L@(i−1), L'@(j+1))<$\tau_{arr}$(t',j+1)−$\tau_{dep}$(t',j))+$\Delta\tau_{fp}$(L@i, L'@j) is verified.

10. The method according to claim 8, wherein a transfer a transfer (i, L'@j, $\Delta T_{fp}$(L@i, L'@j)), for line L, from the set of feasible transfers T (L) is electronically removed, using an electronic processor and electronic memory, when for all trips t, if t' is the earliest trip from line L' such that the transfer from trip t at t@(i−1) to trip t' at t'@(j+1), $\tau_{arr}$(t,i−1)+$\Delta\tau_{fp}$(L@(i−1), L'@(j+1))<$\tau_{arr}$(t',j+1)−$\tau_{dep}$(t',j))+$\Delta\tau_{fp}$(L@i, L'@j) is verified.

11. The method as claimed in claim 8, further comprising:
(e) electronically preprocessing, using an electronic processor and electronic memory, using T(t)=U$_L$T(t, L'), the set of feasible transfers T (t, L') for all destination line L' within a multimodal transportation network so as to obtain a subset of feasible transfers $\bar{T}$(t).

12. The method as claimed in claim 9, further comprising:
(e) electronically preprocessing, using an electronic processor and electronic memory, using $T(t')=U_L\cdot T(t, L')$, the set of feasible transfers $T(t, L')$ for all destination line L' within a multimodal transportation network so as to obtain a subset of feasible transfers $\overline{T}(t)$.

13. The method as claimed in claim 10, further comprising:
(e) electronically preprocessing, using an electronic processor and electronic memory, using $T(t)=U_L\cdot T(t, L')$, the set of feasible transfers $T(t, L')$ for all destination line L' within a multimodal transportation network so as to obtain a subset of feasible transfers $\overline{T}(t)$.

14. The method as claimed in claim 11, further comprising:
(f) electronically outputting, using an electronic processor and electronic memory, the subset of feasible transfers $\overline{T}(t)$ for computing at least one itinerary in the multimodal transportation network.

15. The method as claimed in claim 12, further comprising:
(f) electronically outputting, using an electronic processor and electronic memory, the subset of feasible transfers $\overline{T}(t)$ for computing at least one itinerary in the multimodal transportation network.

16. The method as claimed in claim 13, further comprising:
(f) electronically outputting, using an electronic processor and electronic memory, the subset of feasible transfers $\overline{T}(t)$ for computing at least one itinerary in the multimodal transportation network.

17. The method as claimed in claim 1, wherein if there are tied computed feasible transfers in the decreasing origin line index sorting, the tied computed feasible transfers are electronically sorted, using an electronic processor and electronic memory, by increasing destination line index.

* * * * *